US011768291B1

(12) United States Patent
Wachs

(10) Patent No.: US 11,768,291 B1
(45) Date of Patent: Sep. 26, 2023

(54) HIGH DYNAMIC RANGE RANGING INTERFEROMETER

(71) Applicant: Ball Aerospace & Technologies Corp., Boulder, CO (US)

(72) Inventor: Jordan Wachs, Belmont, MA (US)

(73) Assignee: Ball Aerospace & Technologies Corp., Boulder, CO (US)

(*) Notice: Subject to any disclaimer, the term of this patent is extended or adjusted under 35 U.S.C. 154(b) by 766 days.

(21) Appl. No.: 16/846,830

(22) Filed: Apr. 13, 2020

Related U.S. Application Data

(60) Provisional application No. 62/832,464, filed on Apr. 11, 2019.

(51) Int. Cl.
*G01S 17/58* (2006.01)
*G01S 7/481* (2006.01)

(52) U.S. Cl.
CPC ............ *G01S 17/58* (2013.01); *G01S 7/4814* (2013.01); *G01S 7/4816* (2013.01)

(58) Field of Classification Search
CPC ....... G01S 17/58; G01S 7/4814; G01S 7/4816
See application file for complete search history.

(56) References Cited

U.S. PATENT DOCUMENTS

| 4,771,290 A | 9/1988 | Storey, Jr. |
| 4,830,486 A | 5/1989 | Goodwin |
| 4,942,404 A | 7/1990 | Kefer |
| 5,343,212 A | 8/1994 | Rose et al. |
| 5,606,409 A | 2/1997 | Schneiter |
| 7,389,180 B2 | 6/2008 | Pearce et al. |
| 7,667,824 B1 | 2/2010 | Moran |
| 7,711,477 B2 | 5/2010 | Pearce et al. |
| 7,787,131 B1 | 8/2010 | Moran |

FOREIGN PATENT DOCUMENTS

EP 2871492 A1 * 5/2015 ............. G01S 17/36

* cited by examiner

*Primary Examiner* — Michael D Lang
(74) *Attorney, Agent, or Firm* — Sheridan Ross P.C.

(57) ABSTRACT

Systems and methods for measuring relative velocities of platforms are provided. More particularly, light of a single wavelength is directed from a primary platform to a secondary platform as a probe signal. A shift in the frequency of the probe signal caused by a different relative velocity of the platforms is measured. The measurement is performed by using a heterodyne signal produced by mixing the return signal with light at a plurality of different, evenly spaced frequencies, provided from a local oscillator in the form of a frequency comb generator. This configuration enables precise measurements of relative velocity over wide range of velocities.

20 Claims, 5 Drawing Sheets

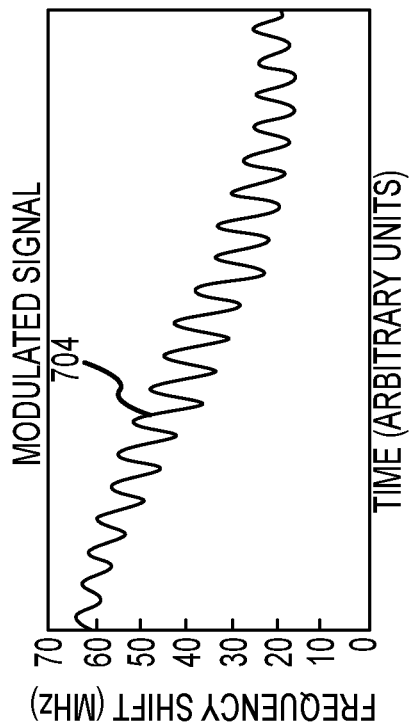
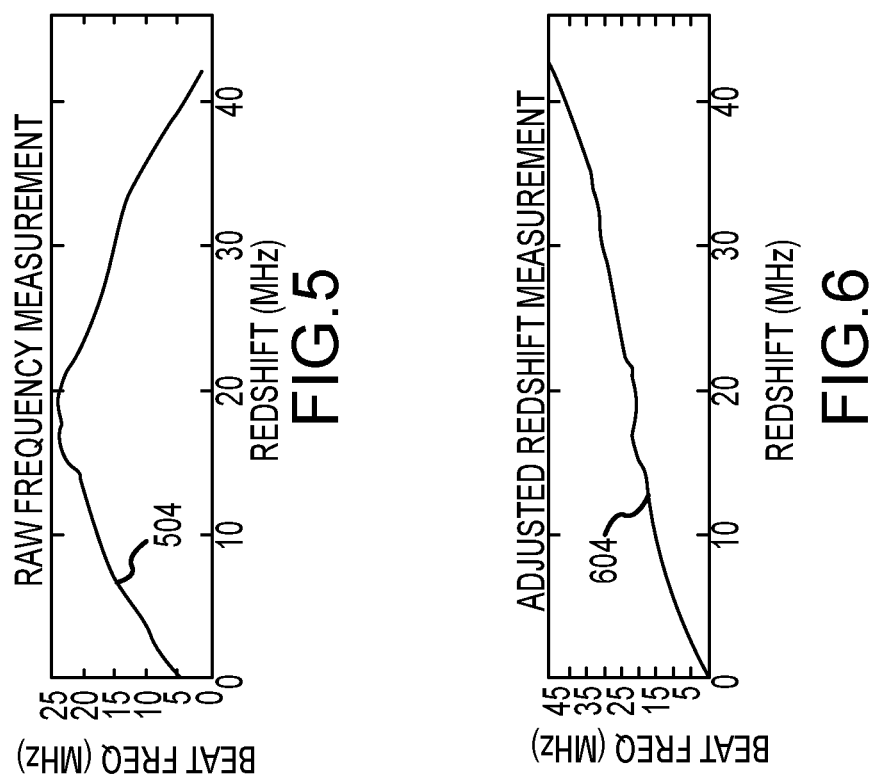

HIGH DYNAMIC RANGE RANGING INTERFEROMETER

CROSS-REFERENCE TO RELATED APPLICATIONS

This application claims the benefit of U.S. Provisional Patent Application Ser. No. 62/832,464, filed Apr. 11, 2019, the entire disclosure of which is hereby incorporated herein by reference.

FIELD

The present disclosure provides systems and methods for measuring relative displacements.

BACKGROUND

Precise measurements are important for ensuring accurate control and high levels of performance in many systems. For example, measurements of differences in the gravity of the Earth have been made by measuring the relative accelerations and decelerations between a pair of orbiting satellites travelling in a lead-follow configuration. However, these systems have had very limited dynamic range. In particular, because the relative velocity is measured by determining the doppler shift of laser light using a reference laser having a single, fixed wavelength, the relative velocity difference that can be measured is limited to about 10 m/s. Accordingly, as the satellites may be travelling at velocities in excess of 7500 m/s, the measurements can only be made if the satellites are travelling within nearly identical orbits.

SUMMARY

The present disclosure can be used to measure relative position and velocity changes between two or more moving platforms, including but not limited to spacecraft. Measurements are made by propagating a laser beam to a nearby platform and measuring a returned signal. The signal will be frequency shifted due to relative velocity between the platforms. The frequency shift is tracked with a heterodyne measurement that uses an optical frequency comb as the local oscillator. Use of the optical frequency comb allows for high precision even in the presence of large relative velocities between the two platforms.

Systems in accordance with embodiments of the present disclosure include an active component set carried by a first platform, and a passive component set carried by a second platform. Light from a light source included in the active component set is directed such that it intersects a reflector included as part of the passive component set. Differences in velocity between the first and second platforms will cause light reflected from the reflector and received at the active component set to be shifted in frequency as compared to the light as it is generated at the light source. The returned light is mixed with signals produced by a frequency comb generator. The resulting heterodyne signal is measured by an IQ detector included in the active component set. The heterodyne signal can be digitally corrected to allow for the tracking of frequency shifts across multiple comb lines, allowing a wide range of differential velocities to be measured.

Methods in accordance with embodiments of the present disclosure include sending a continuous wave signal at a selected frequency from a first platform to a second platform. A shift in the frequency of the light of the selected frequency that is reflected from the second platform back to the first platform is measured by mixing the received signal with the output of a frequency comb generator. In accordance with embodiments of the present disclosure, the output of the frequency comb generator includes a plurality of signals at different, equally spaced frequencies. The measurement of the frequency shift can be made using IQ detection techniques.

Additional features and advantages of embodiments of the disclosed systems and methods will become more readily apparent from the following description, particularly when taken together with the accompanying drawings.

BRIEF DESCRIPTION OF THE DRAWINGS

FIG. 5 depicts a raw heterodyne signal in accordance with embodiments of the present disclosure;

FIG. 6 depicts an example adjusted heterodyne signal in accordance with embodiments of the present disclosure; and FIG. 7 depicts a measured frequency shift resulting from passing signals between platforms in an example scenario in accordance with embodiments of the present disclosure.

DETAILED DESCRIPTION

Figure 1:
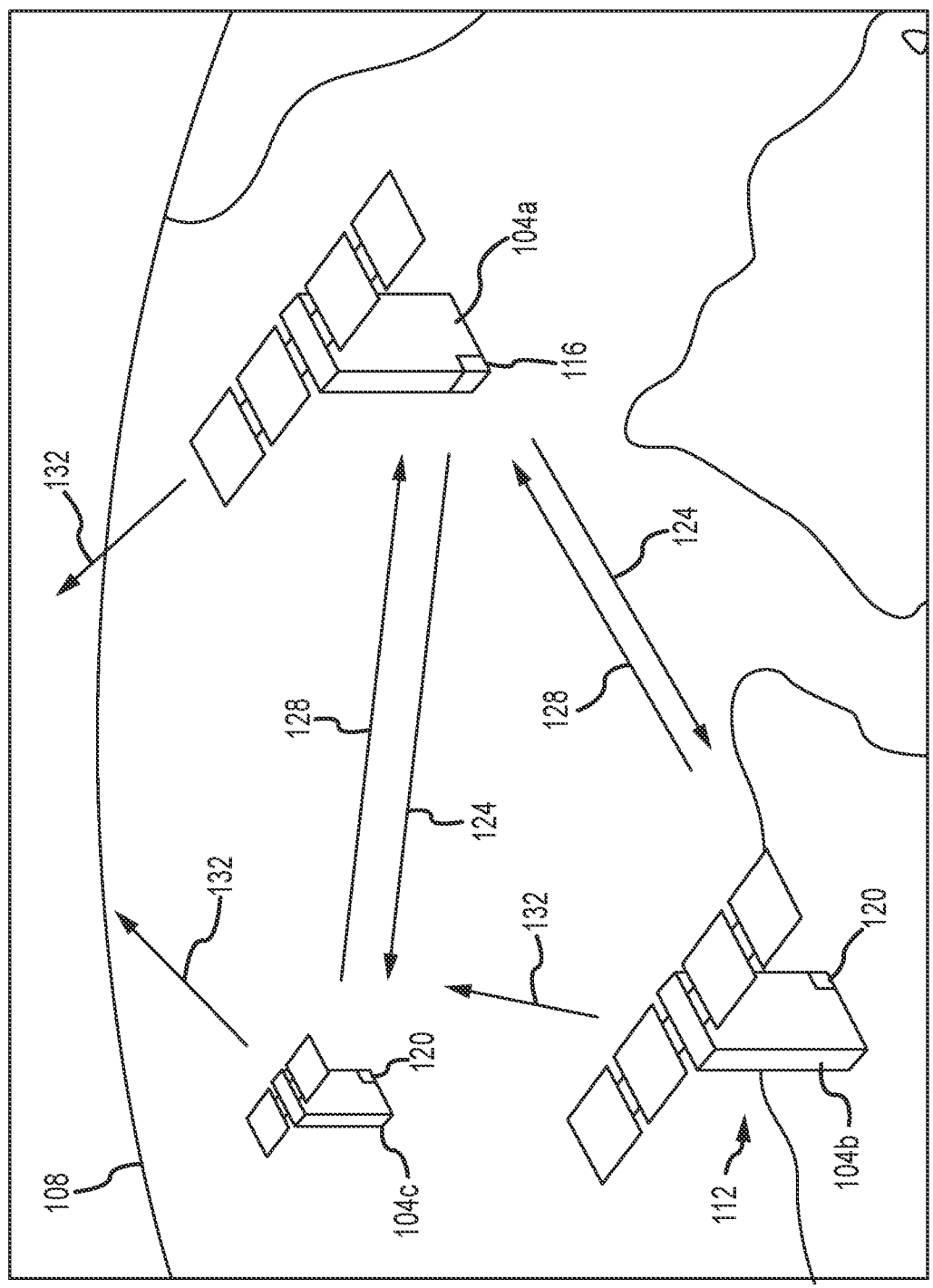
FIG. 1 illustrates an example scenario in which a metrology system in accordance with embodiments of the present disclosure can be applied.

FIG. 1 illustrates an example scenario in which a metrology system 112 in accordance with embodiments of the present disclosure can be applied. In this example, a plurality of platforms 104 carrying components of the metrology system 112 are in orbit about the Earth 108. In general, the metrology system 112 operates to measure the relative position and velocity of at least one platform 104 carrying active components 116 of the metrology system 112, and another platform 104 carrying passive components 120 of the metrology system 112. In the figure, a first platform 104a is depicted as including active components 116 of the metrology system 112, and second 104b and third 104c platforms are depicted as including passive components 120 of the metrology system 112. However, other combinations are possible. For example, a platform 104 can carry both active 116 and passive 120 components.

In the illustrated example, relative motion between a primary platform 104a and a secondary platform (e.g. 104b or 104c) is measured by propagating a probe laser beam 124 from the active components 116 on the first platform 104a that intersects the other platform 104b (or 104c). At least some light included in the probe laser beam 124 is reflected from the passive components 120 on the other platform 104b (or 104c) as a return signal 128. The return signal 128 will be frequency shifted due to the presence of a relative velocity between the platforms 104. In the illustrated example, the platforms 104 are shown as satellites traversing different orbital paths 132 relative to the earth 108. However, it should be appreciated that embodiments of the present disclosure are not limited to use in connection with a platform 104 in the form of a satellite in orbit about the Earth 108. Instead, a metrology system 112 as disclosed herein can be applied to measure a relative, line of sight velocity difference between a first platform 104, whether stationary or moving, and another platform 104 that is moving relative to the first platform 104. Other examples of platforms 104 in accordance with embodiments of the present disclosure include a spacecraft, an orbiter, a lander, an aircraft, a balloon, a ship, or any other platform or device to which active 116 and/or passive components 120 of the system 112 can be mounted. In addition, different components 116 and 120 of a metrology system 112 in accordance with embodiments of the present disclosure can be carried by or mounted to platforms 104 of different types. Moreover, embodiments of the present disclosure are not limited to measuring the relative velocity of platforms 104 moving in the same or similar orbital planes. In addition, embodiments of the present disclosure are not limited to measuring relative velocities of platforms 104 travelling at the same or similar velocities. Instead, as will become apparent from the present disclosure, embodiments of the present disclosure allow relative velocities of platforms 104 travelling in different planes or directions and a different velocities to be determined.

Figure 2:
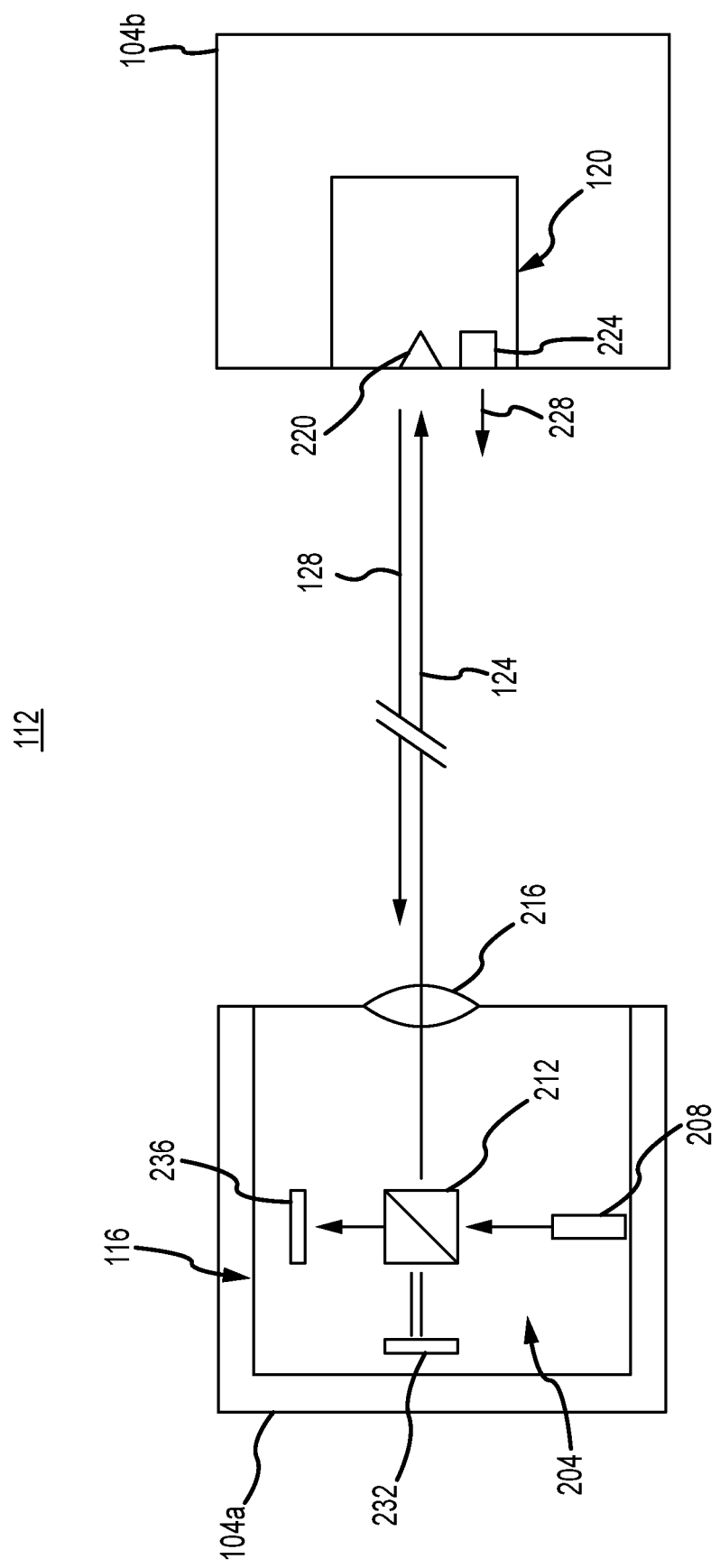
FIG. 2 depicts components of a metrology system in accordance with embodiments of the present disclosure.

FIG. 2 depicts components of a metrology system 112 in accordance with embodiments of the present disclosure. Active components 116 of the metrology system 112 are carried by the first or primary platform 104*a*, and passive components 120 are carried by a second or secondary platform 104*b*. In the depicted embodiment, the active components 116 include an interferometer 204 having a probe laser 208 that operates to generate light that forms the propagated probe laser beam 124. The light output by the probe laser 208 can have a fixed wavelength (frequency). The output from the probe laser 208 is received at a polarizing beam splitter 212, which directs the probe laser beam 124 to an optical assembly 216. The probe laser beam 124 is then sent by the optical assembly 216 across free space, and in the example illustrated in FIG. 2, such that the beam is incident on the passive components 120 of the metrology system 112.

The passive components 120 include a reflector, for example a retroreflector 220. The retroreflector 220 reflects at least a portion of the probe laser beam 124 light back to the active components 116 of the metrology system 112 as the return signal 128. Moreover, the retroreflector 220 establishes a reference point on the secondary platform 104*b* for the measurements made by the interferometer 204. In accordance with at least some embodiments of the present disclosure, the reference point established by the retroreflector 220 can located at the center of gravity of the secondary platform 104*b*. As can be appreciated by one of skill in the art after consideration of the present disclosure, any difference in the relative velocity of the first 104*a* and second 104*b* platforms will result in a shift or change in the frequency or wavelength of the return signal 128 as compared to the frequency or wavelength of the probe laser beam 124. In addition to the retroreflector 220, the passive components 120 can include a beacon 224, which outputs a beacon signal 228 that can be used to point the active components 116 such that the probe laser beam 124 encompasses the passive components 120.

Light included in the return signal 128 is passed from the optical assembly 216, through the polarizing beam splitter 212. The light passed by the polarizing beam splitter 212 is reflected by a reference mirror 232 back to the polarizing beam splitter 212. The polarizing beam splitter 212 then directs the light from the return signal 128 to a detector assembly 236.

Figure 3:
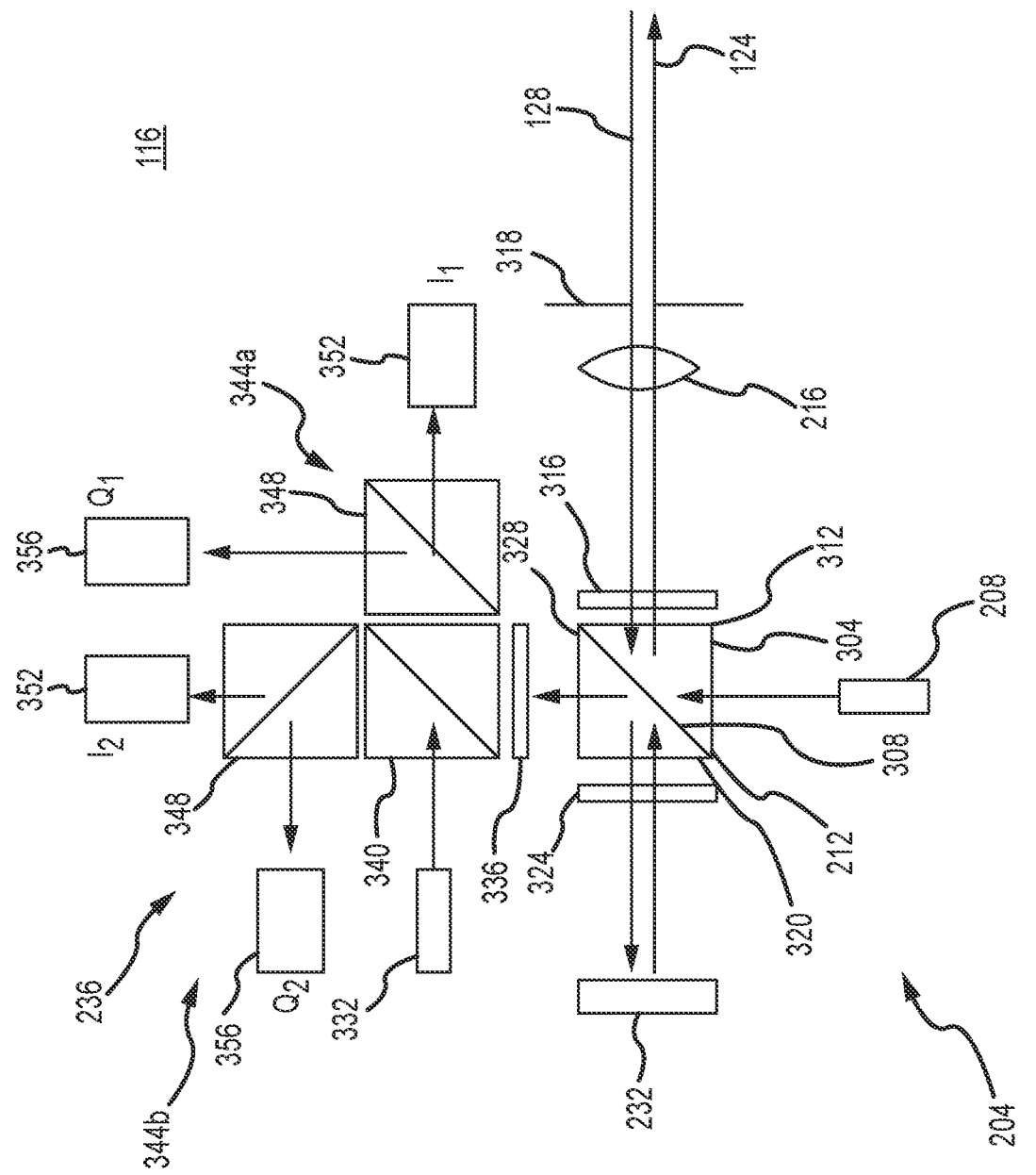
FIG. 3 depicts active components of a metrology system in accordance with embodiments of the present disclosure.

With reference now to FIG. 3, additional details and aspects of the active components 116 of the metrology system 112 and the operation thereof are depicted. As shown, light from the probe laser 208 is directed to a first face 304 of the polarizing beam splitter 212. In accordance with at least some embodiments of the present disclosure, the probe laser 208 produces light having a single, fixed wavelength. In accordance with further embodiments, the probe laser 208 may be a continuous wave laser. In accordance with other embodiments, the probe laser 208 may emit light at multiple wavelengths. The light from the probe laser 208 enters the polarizing beam splitter 212 through the first face 304, and is directed by the beam splitting surface 308 to the second face 312 of the polarizing beam splitter 212. The light then exits the second face 312, and is passed through a first quarterwave plate 316 positioned adjacent the second face 312. The light is then passed to the optical assembly 216, which directs the light through a field stop 318, and across free space as the probe laser beam 124.

Light within the probe laser beam 124 that is incident on the retroreflector 220 carried by a secondary platform 104 and that is reflected as a return signal 128 is passed through the field stop 318 and the optical assembly 216, and through the first quarterwave plate 316. The light then enters the polarizing beam splitter 212 through the second face 312, exits through a third face 320, and is passed through a second quarterwave plate 324. The light is then reflected by a reference mirror 232 back through the second quarterwave plate 324, is passed into the polarizing beam splitter 212 through the third face 320, and is reflected by the beam splitting surface 308. In accordance with at least some embodiments of the present disclosure, the reference mirror 232 can establish a reference point on the primary platform 104*a* for the measurement made by the interferometer 204. In accordance with the least some embodiments, the reference point established by the reference mirror 232 can correspond to the center of gravity of the primary platform 104*a*. The light then passes through a fourth face 328 of the polarizing beam splitter 212, and to the detector assembly 236.

In accordance with embodiments of the present disclosure, the detector assembly 236 includes a local oscillator in the form of a frequency comb generator 332 that operates to generate light at a plurality of regularly spaced frequencies. Moreover, in accordance with embodiments of the present disclosure, the detector assembly 236 generally implements an IQ detector. Light from the return signal 128 exiting the fourth face 328 of the polarizing beam splitter 212 is passed through a detector assembly quarterwave plate 336. The light from the return signal 128 then enters a first non-polarizing beam splitter 340, where it is mixed with light from the frequency comb generator 332. Light from the non-polarizing beam splitter 340 is then passed to first 344*a* and/or second 344*b* IQ detector assemblies, which each include a non-polarizing beam splitter 348, an in-phase detector 352, and a quadrature detector 356. As can be appreciated by one of skill in the art after consideration of the present disclosure, the use of one or more IQ detectors 344 allows the phase variations due to differences in the velocities of the primary 104*a* and a secondary 104*b* platform to be determined. In particular IQ detection is used to fully measure the phase information, while polarization is controlled using quarter wave plates and is used to ensure that only the return signal 128 is measured. As can also be appreciated by one of skill in the art after consideration of the present disclosure, the particular locations and arrangements of the various components, including but not limited to the quarterwave plates, can be varied.

As noted, in accordance with at least some embodiments of the present disclosure, the local oscillator of the detector assembly 236 is a frequency comb generator 332. As a particular example, the frequency comb generator 332 may comprise an all-fiber, semiconductor saturable absorber mirror (SESAM) mode-locked comb. In accordance with at least some embodiments, a full octave of spectrum can be used while the comb is fully locked. As can be appreciated by one of skill in the art, the optical frequency comb spectrum of a frequency comb generator is the frequency-domain picture of an ultra-short pulse. In the time domain, the pulse appears as a pulsed signal from a femtosecond laser (e.g. a having a pulse duration on the order of 10s of fs or less). In the frequency domain, the pulse is comprised of individual comb lines, that are spaced evenly across the pulse spectrum. All of the comb lines are simultaneously present and in-phase during the pulse, and interfere destructively outside the pulse.

Although particular configurations of components are illustrated in the figures, other arrangements and configurations are possible. For instance, the use of a reference mirror, QWPs, and/or beam splitters are not required. Instead, the reference mirror can be eliminated entirely, and fiber or a photonic integrated circuit can be used in place of the QWPs and beam splitters. Such alternate embodiments can be applied, for example, in lower precision systems. As can also be appreciated by one of skill in the art after consideration of the present disclosure, the particular locations and arrangements of the various components, including but not limited to the quarterwave plates, can be varied.

Figure 4:
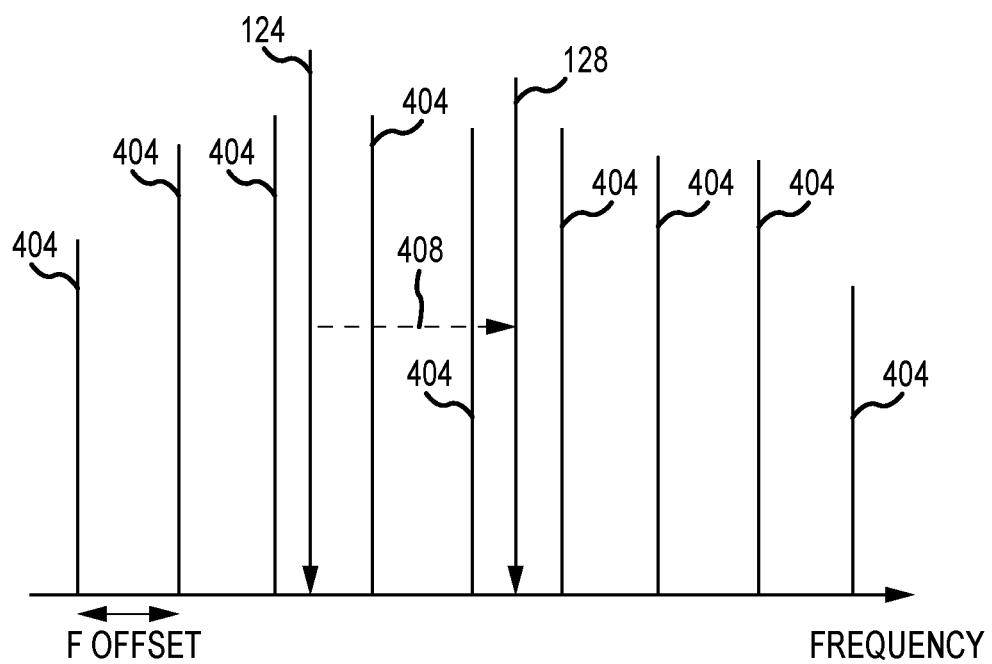
FIG. 4 depicts an example output of a frequency comb generator and of probe and return signals in accordance with embodiments of the present disclosure.

FIG. 4 depicts an example output of a frequency comb generator 332 in accordance with embodiments of the present disclosure. As illustrated in the figure, a frequency comb generator 332 produces an output in the form of a series or set of signals 404 at frequencies that are equally spaced from one another by an offset amount $f_{offset}$. As an example, the offset amount may be 100 MHz. The frequency comb generator 332 is controlled so that it outputs frequencies over a range that encompasses a frequency or frequencies of the probe laser beam 124 output by the probe laser 208. As can be appreciated by one of skill in the art after consideration of the present disclosure, the light in the return signal 128 will be shifted to a higher or lower frequency as compared to the frequency of the probe laser beam 124 if the secondary platform 104b illuminated by the probe laser beam is moving towards or away from the primary platform. This shift 408 is depicted as a displacement of the return signal 128 relative to the probe laser beam and relative to the spectrum of signals 404 output by the frequency comb generator 332. When the light in the return signal 128 is mixed with the light from the local oscillator 332, heterodyne signals are created.

FIG. 5 illustrates the raw heterodyne measurement 504 of the return signal 128 as the frequency of that signal 128 tracks between two adjacent comb lines 404 output by the frequency comb generator 332. In particular, the heterodyne frequency 504 that results as the frequency shift (Doppler shift) of the return signal 128 varies due to different relative velocities of the primary platform 104a, carrying the interferometer 204, and the secondary platform 104b, carrying a retroreflector 220, is illustrated. In FIG. 6, an adjusted measurement 604, in which the data from FIG. 5 has been digitally corrected or adjusted to account for the interference of the output frequencies of the repetitive comb spectrum falling on either side of the frequency of the light of the return signal 128, is illustrated. This digital correction allows for the frequency of the return signal 128 to be tracked across multiple comb lines 404. In addition, using this technique it is possible to continuously measure signals with low and high frequency components. FIG. 7 illustrates a signal 704 that depicts a measured frequency shift resulting from signals 124 and 128 passed between platforms 104a and 104b in an example scenario in accordance with embodiments of the present disclosure. In the figure, it can be seen that the signal 704 has the characteristics of a low frequency sinusoid, such as from an orbital period, that is modulated with higher frequency components, such as those from variations in the Earth's magnetic field.

Embodiments of the present disclosure provide a light based system 112 for measuring a relative velocity between two platforms 104. Moreover, a local oscillator in the form of a frequency comb generator 332 is used to produce a heterodyne signal by mixing the output of the frequency comb generator 332 with a continuous wave, fixed signal 124 sent from an active component 116 on a primary platform 104a, and reflected from a passive component 120 on a secondary platform 104b back to the active component 116. This unique configuration allows a frequency or color shift of the signal resulting from a difference in the velocity of the primary platform 104a relative to the secondary platform 104b to be measured. Moreover, because the frequency comb generator 332 type local oscillator generates signals 404 spaced across a wide range of frequencies, a large range of frequency shifts can be measured. Accordingly, the dynamic range of the interferometer 204 as disclosed herein is many times greater than systems using a local oscillator generating a single frequency. This in turn enables the interferometer 204 to determine the relative velocity of platforms 104 that are in different orbits than the primary platform 104a. Moreover, embodiments of the present disclosure provide a metrology system 112 capable of providing measurements in three dimensions, particularly when the measured data is combined with known orbital location data. Accordingly, gravitational surveys and the like can operate using orbits that better capture certain features of interest. For instance, where the platforms 104 are satellites operating in polar orbits, the satellites can be operated in other than a strict, common plane, lead-follow configuration, allowing north-south oriented terrestrial features, such as the Rocky Mountains, to be more accurately surveyed.

Embodiments of the present disclosure also provide the ability to track the relative velocity of multiple secondary platforms 104b and/or 104c from a primary platform 104a. For instance, embodiments of the present disclosure can be operated to form a probe beam 124 that is broad enough to encompass multiple secondary platforms 104 simultaneously. The signals returned from the secondary platforms 104 can be wavelength coded using filters, such as wavelength selective coatings, incorporated into the retroreflectors 220 of the secondary platforms 104, enabling the relative velocity information measured by the interferometer 204 to be accurately associated with the secondary platform 104b or 104c causing the respective measured frequency shifts. Alternatively, return signals can be modulated with an identifying signal. Moreover, because of the very high accuracy that can be achieved by the disclosed system (e.g. 1 nm or less in distance), applications for embodiments that require the maintenance of precise spacing between moving platforms 104 are enabled.

Embodiments of the present disclosure can implement pointing of the probe laser beam 124 by pointing the platform 104 itself. Alternatively or in addition, a steering mechanism can be associated with the interferometer 204. Suitable steering mechanisms include steering mirrors, adaptive optics, a gimbaled interferometer mount, and gimbaled optics.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
    a set of active components, including:
        a light source, wherein the light source generates light of at least a first wavelength;
        a polarizing beam splitter;
        a non-polarizing beam splitter;
        a frequency comb generator, wherein the frequency comb generator outputs light at a plurality of frequencies; and
        a plurality of detectors; and
    a set of passive components, including:
        a reflector,
    wherein light from the light source is passed by the polarizing beam splitter toward the reflector, reflected by the reflector, received at the polarizing beam splitter, passed by the polarizing beam splitter to the non-polarizing beam splitter, mixed in the non-polarizing beam splitter with the light output from the frequency comb generator, and detected by the plurality of detectors to measure a frequency shift between the light as output by the light source and the light as reflected by the reflector.

2. The system of claim 1, wherein the set of active components additionally includes:
    an optical system, wherein the light from the light source and passed by the polarizing beam splitter is directed to the reflector by the optical system, and wherein the light reflected by the reflector is received by the optical system before it is received at the polarizing beam splitter.

3. The system of claim 2, wherein the non-polarizing beam splitter is a first non-polarizing beam splitter, the system further comprising:
    a second non-polarizing beam splitter; and
    a third non-polarizing beam splitter,
    wherein light from the first non-polarizing beam splitter is directed to the second and third non-polarizing beam splitters, and wherein light from the second and third non-polarizing beam splitters is directed to the plurality of detectors.

4. The system of claim 3, wherein a first one of the detectors is adjacent a first face of the second non-polarizing beam splitter, wherein a second one of the detectors is adjacent a second face of the second non-polarizing beam splitter, wherein a third one of the detectors is adjacent a first face of the third non-polarizing beam splitter, and wherein a fourth one of the detectors is adjacent a second face of the third non-polarizing beam splitter.

5. The system of claim 4, further comprising:
    a plurality of quarterwave plates, wherein a first one of the quarterwave plates is between the polarizing beam splitter and the optical system, wherein a second one of the quarterwave plates is between the polarizing beam splitter and a reference mirror, and wherein a third one of the plurality of quarterwave plates is between the polarizing beam splitter and the first non-polarizing beam splitter.

6. The system of claim 1, wherein each frequency of the frequencies of the light output by the frequency comb generator is spaced apart from an adjacent frequency by a same amount.

7. The system of claim 6, wherein the same amount is 100 MHz.

8. The system of claim 1, wherein the active components are carried by a first platform, and wherein the passive components are carried by a second platform.

9. A system, comprising:
    a set of active components, including:
        a light source, wherein the light source generates light of at least a first wavelength;
        a frequency comb generator, wherein the frequency comb generator outputs light at a plurality of frequencies, wherein each frequency of the plurality of frequencies of the light output by the frequency comb generator is spaced apart from an adjacent one of the frequencies of the light output by the frequency comb generator by a same amount, and wherein the same amount is 100 MHz; and
        a plurality of detectors; and
    a set of passive components, including:
        a reflector, wherein light from the light source is reflected by the reflector, mixed with at least a first signal from the frequency comb generator, and detected by the plurality of detectors to measure a frequency shift between the light as output by the light source and the light as reflected by the reflector.

10. The system of claim 9, wherein the active components are carried by a first platform, and wherein the passive components are carried by a second platform.

11. A system, comprising:
    an interferometer, including:
        a laser light source;
        a frequency comb generator;
        an optical assembly;
        a polarizing beam splitter; and
        a non-polarizing beam splitter, wherein the laser light source outputs light at a first frequency, wherein the light output by the laser light source is directed to the polarizing beam splitter, wherein the optical assembly is located to receive light that exits the polarizing beam splitter, wherein the optical assembly forms a probe laser beam, wherein the optical assembly directs light in a return signal to the polarizing beam splitter, wherein the non-polarizing beam splitter is located to receive light in the return signal that exits the polarizing beam splitter, wherein the frequency comb generator is located to provide light at a plurality of reference frequencies to the non-polarizing beam splitter, and wherein heterodyne signals are produced at the non-polarizing beam splitter by combining the return signal with the light at the plurality of reference frequencies.

12. The system of claim 11, further comprising:
a reference mirror, wherein the light output by the laser light source is directed to a first face of the polarizing beam splitter, wherein the reference mirror is located adjacent to a second face of the polarizing beam splitter, wherein the optical assembly is located adjacent to a third face of the polarizing beam splitter, wherein a first face of the non-polarizing beam splitter is located adjacent to a fourth face of the polarizing beam splitter, and wherein the frequency comb generator is located adjacent to a second face of the non-polarizing beam splitter.

13. The system of claim 12, further comprising:
a first quarterwave plate between the reference mirror and the second face of the polarizing beam splitter;
a second quarterwave plate between the optical assembly and the third face of the polarizing beam splitter; and
a third quarterwave plate between the fourth face of the polarizing beam splitter and the first face of the non-polarizing beam splitter.

14. The system of claim 11, further comprising:
a plurality of detectors, wherein the non-polarizing beam splitter delivers the heterodyne signals to the detectors.

15. The system of claim 11, wherein the reference frequencies in the plurality of reference frequencies provided by the frequency comb generator are spaced apart from one another by 100 MHz.

16. A method of measuring a relative velocity between platforms, comprising:
sending a probe laser beam from a primary platform to a plurality of secondary platforms;
receiving a frequency shifted version of the probe laser beam as a return signal from each of the plurality of secondary platforms at the primary platform;
mixing the return signals with reference signals from a frequency comb generator to produce heterodyne signals, wherein the reference signals include a plurality of equally spaced reference signals; and
determining a relative velocity of the platforms from a measured frequency shift using the heterodyne signals, wherein a frequency shifted version of the probe laser beam is received as a return signal from the plurality of secondary platforms simultaneously, wherein a first relative velocity between the primary platform and a first secondary platform is determined, and wherein a second relative velocity between the primary platform and a second secondary platform is determined.

17. The method of claim 16, wherein the probe laser beam and the return signals are passed through a polarizing beam splitter.

18. The method of claim 17, wherein the return signals are mixed with the reference signals in a non-polarizing beam splitter.

19. The method of claim 16, wherein the return signals are mixed with the reference signals in a non-polarizing beam splitter.

20. A method of measuring a relative velocity between platforms, comprising:
sending a probe laser beam from a primary platform to a secondary platform;
receiving a frequency shifted version of the probe laser beam as a return signal from the secondary platform at the primary platform;
mixing the return signal with reference signals from a frequency comb generator to produce a heterodyne signal, wherein the reference signals include a plurality of equally spaced reference signals; and
determining a relative velocity of the platforms from a measured frequency shift using the heterodyne signal, wherein the frequency shift is measured using IQ detection.

* * * * *